(12) United States Patent
Elliott

(10) Patent No.: US 8,645,448 B2
(45) Date of Patent: *Feb. 4, 2014

(54) CARRYLESS MULTIPLICATION UNIT

(75) Inventor: Timothy A. Elliott, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 676 days.

This patent is subject to a terminal disclaimer.

(21) Appl. No.: 12/960,231

(22) Filed: Dec. 3, 2010

(65) Prior Publication Data

US 2012/0143933 A1 Jun. 7, 2012

(51) Int. Cl.
*G06F 7/00* (2006.01)
*G06F 7/38* (2006.01)

(52) U.S. Cl.
USPC .......................................... 708/492; 708/629

(58) Field of Classification Search
USPC ........................................ 708/492, 620–632
See application file for complete search history.

(56) References Cited

U.S. PATENT DOCUMENTS

| | | | |
|---|---|---|---|
| 5,787,099 A | 7/1998 | Lan et al. | |
| 5,974,435 A | 10/1999 | Abbott | |
| 6,366,941 B1 | 4/2002 | Wolf et al. | |
| 6,636,882 B1 | 10/2003 | Su et al. | |
| 6,684,236 B1 | 1/2004 | Farnbach | |
| 6,701,336 B1 | 3/2004 | Shen et al. | |
| 6,760,742 B1 | 7/2004 | Hoyle | |
| 7,003,715 B1 | 2/2006 | Thurston | |
| 7,373,368 B1 | 5/2008 | Rarick et al. | |
| 7,552,163 B2 | 6/2009 | Son | |
| 7,774,679 B2 | 8/2010 | Hassner et al. | |
| 8,271,570 B2 | 9/2012 | Gopal et al. | |
| 2005/0033790 A1 | 2/2005 | Hubert | |
| 2009/0006517 A1 | 1/2009 | Gopal et al. | |
| 2011/0276790 A1* | 11/2011 | Olson et al. | 712/222 |

* cited by examiner

*Primary Examiner* — Chuong D Ngo
*Assistant Examiner* — Kevin G Hughes
(74) *Attorney, Agent, or Firm* — Richard K. Huffman; James W. Huffman

(57) ABSTRACT

An apparatus having a carryless preformat unit, a Booth encoder, a compressor, a left shifter, and exclusive-OR logic. The carryless preformat unit receives a multiplier operand and partitions the multiplier operand into parts. The Booth encoder receives the parts and directs selection of first partial products of a multiplicand that do not reflect implicit carry operations. The compressor sums the first partial products via a configuration of carry save adders that generate sum bits and carry bits, where generation of the carry bits is disabled during execution of the carryless multiplication. The left shifter shifts bits of one or more outputs of the compressor. The exclusive-OR logic is coupled to the compressor and the left shifter, and is configured to execute an exclusive-OR function on the outputs to yield a carryless multiplication result.

22 Claims, 6 Drawing Sheets

BOOTH ENCODING FACTORS ←—200

| BIT PATTERN | MULTIPLYING FACTOR |
|---|---|
| 000 | 0 |
| 001 | +1 |
| 010 | +1 |
| 011 | +2 |
| 100 | -2 |
| 101 | -1 |
| 110 | -1 |
| 111 | 0 |

BOOTH MULTIPLICATION EXAMPLE ←—300

BOOTH ENCODING FACTORS FOR CARRYLESS MULTIPLICATION

CARRYLESS MULTIPLICATION UNIT

CROSS-REFERENCE TO RELATED APPLICATIONS

This application is related to the following co-pending U.S. Patent Applications, each of which has a common assignee and common inventors.

| SER. NO. | FILING DATE | TITLE |
|---|---|---|
| 12/960,239 (CNTR.2531) | Dec. 03, 2010 | MECHANISM FOR CARRYLESS MULTIPLICATION THAT EMPLOYS BOOTH ENCODING |
| 12/960,246 (CNTR.2532) | Dec. 03, 2010 | CARRYLESS MULTIPLICATION PREFORMATTING APPARATUS AND METHOD |

BACKGROUND OF THE INVENTION

1. Field of the Invention

This invention relates in general to the field of microelectronics, and more particularly to a technique for executing a carryless multiplication.

2. Description of the Related Art

Most communications today of any importance are communicated with some form of security feature. The resources available for secure communications range from simple authenticated signatures all the way up through a hashed enciphered message using symmetric key encryption techniques. And one of the modes of operation for symmetric key encryption that is becoming more prevalent is the so-called Galois/Counter Mode (GCM) which provides for both encryption and authentication of a message.

GCM mode is a combination of the well-known counter mode of encryption with the more recently developed Galois mode of authentication. In GCM mode, Galois field multiplication is used for authentication. And while it is beyond the scope of the present application to provide an in-depth discussion of Galois field multiplication, it is sufficient to note that carryless multiplication is the first step that one employs when performing a Galois field multiplication.

Carryless multiplication is also known as binary polynomial multiplication and is the mathematical operation of computing the product of two operands without generating or propagating carries. In fact, INTEL® has provided an instruction, PCLMULQDQ, that directs an x86-compatible microprocessor to perform this very function.

Consequently, as microprocessor designers develop modifications to existing designs to provide more advanced features, carryless multiplication must be considered. This is an operation that is straightforward, but as one skilled in the art will appreciate, requires a significant amount of hardware to implement. For example, consider that a 64-bit carryless multiplication operation comprises the generation of 64 partial products which much then be exclusive-ORed together in order to yield a final 128-bit result. Currently, there is no unit or logic allocated within most microprocessor designs today that will perform this function, however most microprocessors have one or more multiplication units for performing ordinary multiplication.

Yet, as one skilled in the art will appreciate, many improvements have been developed in more recent years that allow present day multiplication units to perform much faster that would otherwise be provided for. For instance, Booth encoding is an extremely common technique that is used to cut the number of partial products in a multiplication by half Wallace trees are also commonly employed as the elements used to add together the partial products that are generated via Booth encoding.

And while very efficient from a performance perspective, the techniques noted above inherently generate and propagate carry bits. As a result, the hardware within a present day multiplication unit is entirely unsuitable for use in carryless multiplications.

The present inventor has noted this disadvantage, and others, and observes that it is desirable in the art to maximize the common use of hardware in order to reduce power consumption and device footprint, and to increase the reliability of a part. In addition, common hardware use is desirable from a debug and testing perspective as well in that well-known elements are being used for a different function.

Therefore, what is needed is an apparatus and method for performing a carryless multiplication operation in a processor or other device which maximizes the use of common hardware elements.

In addition, what is needed is a multiplication unit that is capable of performing both ordinary and carryless multiplication, where modifications to the unit are negligible.

SUMMARY OF THE INVENTION

The present invention, among other applications, is directed to solving the above-noted problems and addresses other problems, disadvantages, and limitations of the prior art. The present invention provides a superior technique that allows existing Booth hardware to be used when performing a carryless multiplication operation in a processor or other device. In one embodiment, an apparatus is provided for performing carryless multiplication. The apparatus has a carryless preformat unit, a Booth encoder, a compressor, a left shifter, and exclusive-OR logic. The carryless preformat unit is configured to receive a multiplier operand, and is configured to partition the multiplier operand into a plurality of parts. The Booth encoder is configured to receive the plurality of parts, and is configured to evaluate the plurality of parts, and is configured to direct selection of first partial products of a multiplicand operand, where the plurality of parts are configured such that the Booth encoder is precluded from selection of second partial products, and where the second partial products reflect implicit carry operations. The compressor is operatively coupled to the Booth encoder, and is configured to sum the first partial products via a configuration of carry save adders that generate sum bits and carry bits, where the carry save adders are arranged in a Wallace tree configuration, and where generation of the carry bits is disabled during execution of the carryless multiplication. The left shifter is coupled to the compressor, and is configured to shift bits of one or more outputs of the compressor. The exclusive-OR logic is coupled to the compressor and the left shifter, and is configured to execute an exclusive-OR function on the outputs to yield a carryless multiplication result.

One aspect of the present invention contemplates a microprocessor, that includes a multiplication unit, which is configured to perform carryless multiplication in addition to normal multiplication. The multiplication unit has a carryless preformat unit, a Booth encoder, a compressor, a left shifter, and exclusive-OR logic. The carryless preformat unit is configured to receive a multiplier operand, and is configured to partition the multiplier operand into a plurality of parts. The Booth encoder is configured to receive the plurality of parts, and is configured to evaluate the plurality of parts, and is configured to direct selection of first partial products of a multiplicand operand, where the plurality of parts are configured such that the Booth encoder is precluded from selection of second partial products, and where the second partial products reflect implicit carry operations. The compressor is operatively coupled to the Booth encoder, and is configured to sum the first partial products via a configuration of carry save adders that generate sum bits and carry bits, where the carry save adders are arranged in a Wallace tree configuration, and where generation of the carry bits is disabled during execution of the carryless multiplication. The left shifter is coupled to the compressor, and is configured to shift bits of one or more outputs of the compressor. The exclusive-OR logic is coupled to the compressor and the left shifter, and is configured to execute an exclusive-OR function on the outputs to yield a carryless multiplication result.

Another aspect of the present invention comprehends a method for performing carryless multiplication. The method includes: within a multiplication unit in a processor, preformatting a multiplier operand into a plurality of parts; via a Booth encoder, evaluating the plurality of parts, and directing selection of first partial products of a multiplicand operand, where the plurality of parts are configured such that the Booth encoder is precluded from selection of second partial products, where the second partial products reflect products having bits derived by propagation of carries; via a plurality of carry save adders configured as a Wallace tree, disabling generation of carry bits, and generating sum bits for the first partial products; left shifting bits of one or more outputs of the Wallace tree; and exclusive-ORing outputs of the Wallace tree to yield a carryless multiplication result.

Regarding industrial applicability, the present invention may be implemented within a MICROPROCESSOR which may be used in a general purpose or special purpose computing device.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on multiplication and carryless multiplication operations and associated techniques employed within present day processors for the generation of multiplication results, a discussion of present day mechanisms along with their limitations will be discussed with reference to FIGS. 1-3. Following this, a discussion of the present invention will be presented with reference to FIGS. 4-7. The present invention overcomes the disadvantages and limitations of present day multiplication mechanisms by providing apparatus and methods for performing carryless multiplication operations which employ all of the hardware that is currently used to perform normal multiplication operations.

Figure 1:
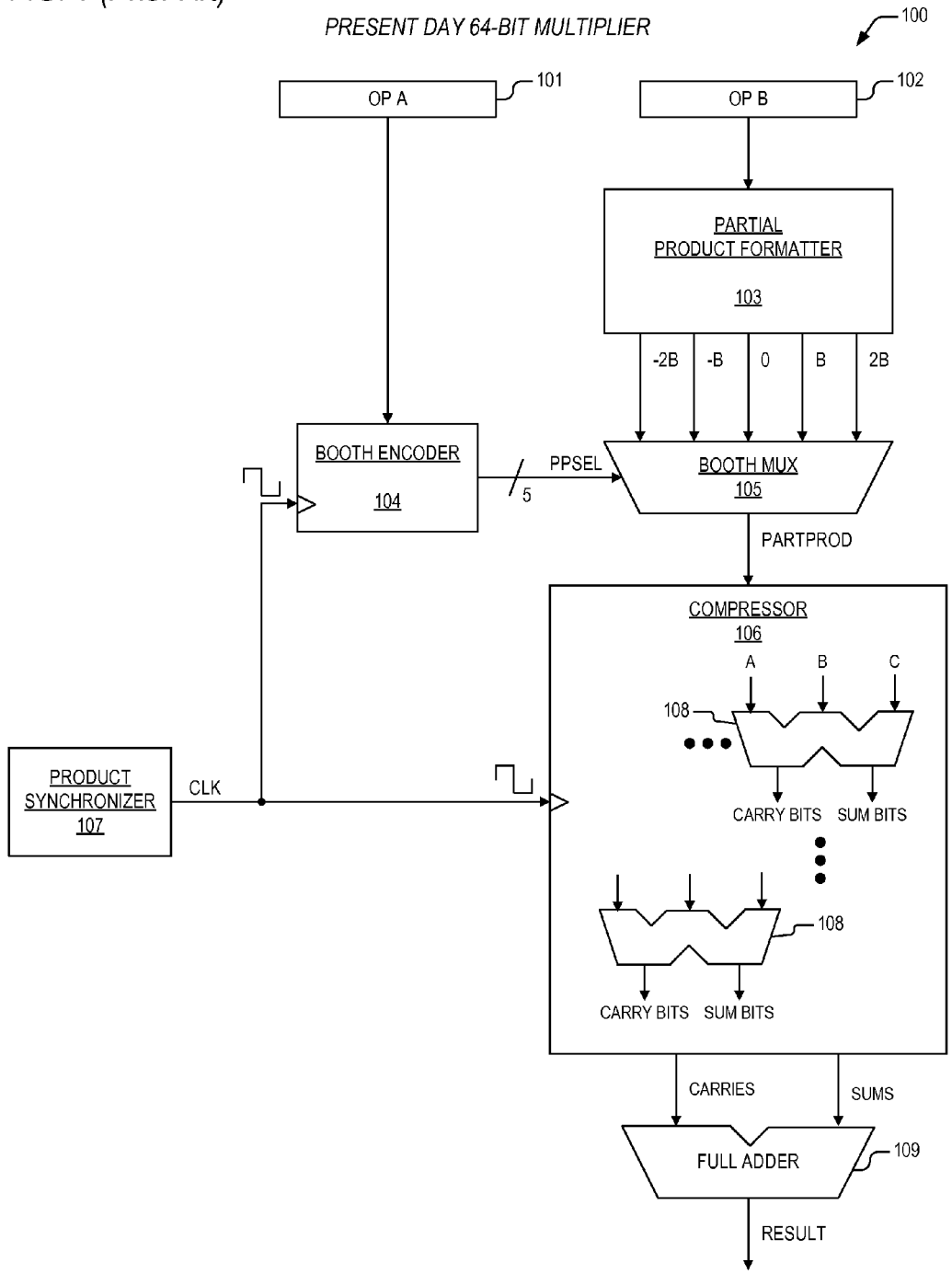
FIG. 1 is a block diagram illustrating an exemplary present day 64-bit multiplication unit, such as may be found in a microprocessor or similar device.

Turning to FIG. 1, a block diagram is presented illustrating an exemplary present day 64-bit multiplication unit 100, such as may be found in a microprocessor or other device. The multiplication unit 100 includes a first operand register 101 that is coupled to a Booth encoder 104. The multiplication unit 100 has a second operand register 102 that is coupled to a partial product formatter 103. Both the Both encoder 104 and the partial product formatter 103 are coupled to a Booth mux 105. The Booth mux 105 is coupled via a bus PART-PROD to a compressor 106. The compressor 106 includes a plurality of carry save adders (CSAs) 108 configured in the well known Wallace tree configuration such as is used in present day multiplication units 100 to reduce propagation delays associated with the summation of numerous partial products. The compressor 106 is coupled to a full adder 109 via two busses, CARRIES and SUMS. The adder 109 generates a 128-bit result of the multiplication in two's complement format via bus RESULT. In addition, a product synchronizer 107 generates a synchronization signal CLK, which is coupled to the Booth encoder 104 and the compressor 106 in order to synchronize operations within the multiplier 100 associated with generation of the final 128-bit product.

In operation, an instruction (not shown) directing that a multiplication operation be performed is typically dispatched to the multiplication unit 100 along with direct, indirect, or immediate reference to two operands for the operation. Accordingly, a 64-bit multiplier operand OP A in two's complement format is provided to the first operand register 101 and a 64-bit multiplicand operand in two's complement format is provided to the second register 102. It is noted that 64-bit registers 101, 102 are depicted in order to teach present day multiplication units 100 because such an operand size is common. However, other configurations may employ different operand register sizes. For example, as one skilled in the art will appreciate, 64-bit multiplication can also be performed by breaking up two 64-bit operands into four 32-bit operands and making multiple passes through the multiplication unit 100 using well known present day techniques and mechanisms.

As is appreciated by those skilled in the art, Booth encoding is employed in present day multipliers 100 as a technique to reduce the number of partial products that are required to be summed in order to produce the final product. Typically, a 3-bit Booth encoder 104 is employed, which successively operates to generate the partial products formed from the results of radix-4 multiplications, thus reducing the number of partial products that are summed to form the final result roughly by a factor of two. Accordingly, in synchronization with signal CLK, the Booth encoder 104 evaluates successive 3-bit segments of the multiplier OP A and asserts one of five select signals to the Booth mux 105 via bus PPSEL. The signals on bus PPSEL direct the Booth mux 105 to select one of five partial products associates with OP B. These partial products are generated by the partial product formatter 103 and include zero times the OP B, plus and minus one times OP B, and plus and minus two times OP B. As one skilled in the art, these five partial products are easily formed by the partial product formatter 103 via either complementing OP B, left shifting OP B, or both complementing and left shifting OP B.

Signal CLK directs the Booth encoder 104 to examine successive 3-bit values of OP A and additionally directs the compressor 106 to store the corresponding partial products until all successive 3-bit values of OP A have been evaluated. The partial products are distributed to associated inputs A, B, C of the configured CSAs 108 in order to yield carry bits on bus CARRIES and sum bits on bus SUMS, which are then summed by the full adder 109 to produce the 128-bit twos complement result on bus RESULT.

Figures 2, 3:
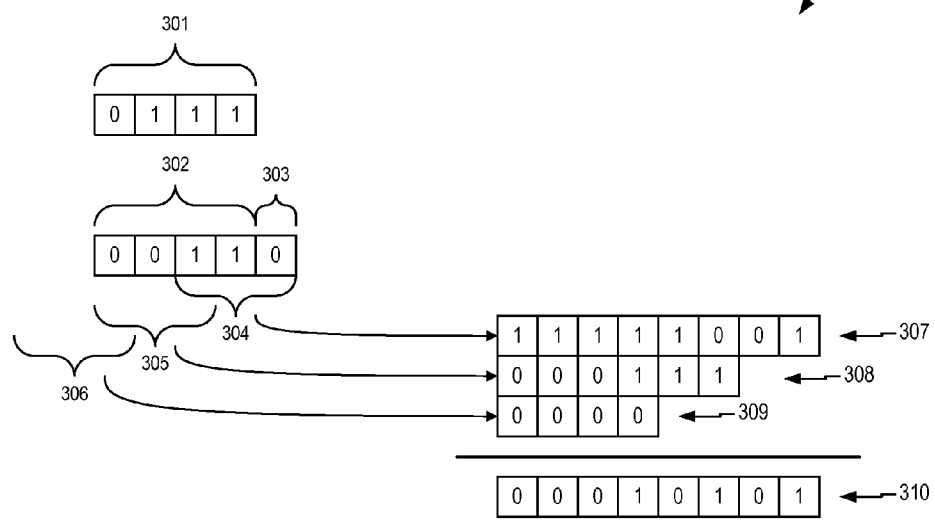
FIG. 2 is a table depicting how Booth encoding is employed in the present day multiplier of FIG. 1 to reduce the number of partial products in a 64-bit multiplication.
FIG. 3 is a diagram featuring a 4-bit multiplication example that depicts how Booth encoding techniques are employed to reduce the number of partial products.

Now referring to FIG. 2, a table 200 is presented depicting how Booth encoding is employed in the present day multiplier of FIG. 1 to reduce the number of partial products in a 64-bit multiplication. As is alluded to above, virtually all present day multiplication units in microprocessors or other devices use Booth encoding, which is a way to produce partial products by taking partial products based on multiple bits of one of the two operands. This technique essentially recodes a radix-2 multiplier into a higher radix number. In the case of a 3-bit booth encoding, the radix-2 multiplier is recoded into a radix-4 multiplier, thus reducing the number of partial products by roughly half. Booth encoding is disclosed in great detail by Kim in U.S. Pat. No. 5,691,930 and the reader is referred thereto for more discussion. The table 200 shows a mapping from a 3-bit pattern of the multiplier (OP A) to a multiplying factor for the multiplicand (OP B). Thus, 3-bit patterns of 000 and 111 map to a multiplying factor of 0. Patterns 001 and 010 map to a multiplying factor of plus one. Patterns 101 and 110 map to a multiplying factor of minus one. Pattern 011 maps to a multiplying factor of plus two. And pattern 100 maps to a multiplying factor of minus 2. The partial product formatter 103 multiplies OP B by the mapped multiplying factors and presents these partial products to the mux 105. As each 3-bit pattern of OP A is evaluated by the Booth encoder 104, an associated select pattern is asserted over bus PPSEL to select the a corresponding partial product.

Turning now to FIG. 3, a diagram 300 is presented featuring a 4-bit multiplication example that depicts how Booth encoding techniques are employed to reduce the number of partial products in a multiplication operation. The diagram 300 shows a 4-bit multiplicand operand 301 such as might be provided to a partial product formatter as discussed above. The diagram 300 also shows a 4-bit multiplier operand 302 such as might be provided to a Booth encoder as described above. As one skilled in the art will appreciate, to perform 3-bit Booth encoding, a 0 bit 303 is initially concatenated to the least significant bit of the multiplier 302. A first 3-bit pattern 304 is mapped according to the table 200 of FIG. 2 to select a 4-bit partial product. The first pattern 304 is 110 and thus maps to a multiplying factor of minus one. A twos complement sign extended partial product 307 is selected which is 11111001. A next 3-bit pattern 305 having one overlapping bit with the first 3-bit pattern 304 is then mapped to multiplying factor plus one. Thus the multiplicand 301 is selected as a partial product 308, which is shifted left by two bits since radix-4 encoding is employed in this example. A final 3-bit pattern 306 is evaluated to a mapping factor of 0. Thus a partial product 309 of value 0000 is selected and shifted left another two bits.

The three partial products 307-309 are then summed to yield an 8-bit multiplication result 310 of value 00010101.

The present inventor has noted that Booth encoding, while being very efficient in terms of performance for executing multiplication operations, cannot be employed to perform carryless multiplications. This is because carries are implicitly introduced as a result of the encoding process when a 3-bit pattern is evaluated such that it is mapped to a multiplication factor of two or minus two. Consequently, as noted above, in order to implement a carryless multiplication operation within a processor or other device, Booth encoding techniques cannot be employed. In addition, existing compressors cannot be employed as well because carries are also summed in those devices.

Thus, the present inventor has noted that in order to perform carryless multiplication operations, an entirely separate carryless multiplication unit must be provided, or at best separate carryless multiplication hardware must be provided within a multiplication unit. As one skilled in the art will appreciate, the introduction of new hardware increases power consumption, reduces reliability, and complicates test and debug of a device.

As one skilled in the art will appreciate, it is highly desirable to utilize existing multiplication hardware in a processor or other device to the maximum extent. But to utilize normal Booth encoding and compression hardware in order to implement a carryless multiplication operation is an apparent impossibility due to the very nature of these elements.

The present invention provides apparatus and methods for implementing a carryless multiplication operation within a processor or other device that utilizes existing Booth encoding elements with only slight modification to existing compression elements. Thus, the present inventor has discovered a technique for performing a carryless multiplication which only necessitates minimal modification to an existing multiplication unit and which does not impact the speed at which normal multiplication operations are performed. The present invention will now be discussed with reference to FIGS. 4-7.

At a summary level, as noted above, Booth encoding introduces carries into a multiplication operation when evaluated bit patterns of the multiplier result in selected partial products that are positive or negative two times the multiplicand. In addition, existing Wallace tree configurations of CSAs propagate carry bits. Accordingly, the present invention provides a technique for carryless multiplication whereby the operation is split into two sub-operations that totally preclude selection of partial products that introduce carries. The present invention also provides a modified compressor that can selectively enable and disable propagation of carries therein.

Figure 4:
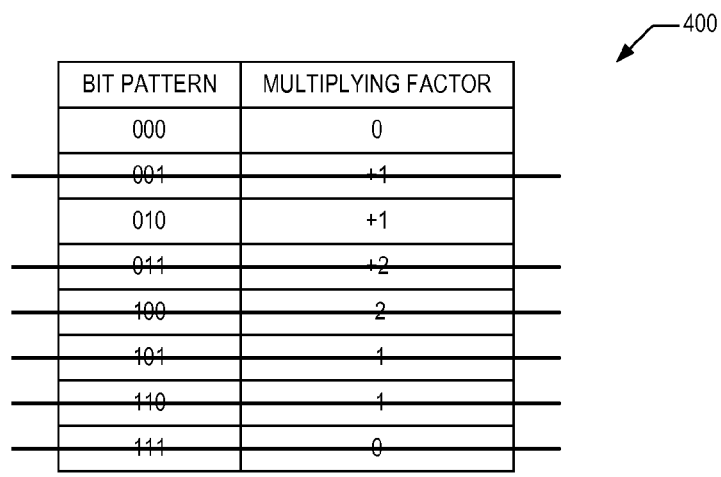
FIG. 4 is a block diagram showing Booth encoding factors that are employed to perform a carryless multiplication according to the present invention.

Referring now to FIG. 4, a table 400 is presented showing Booth encoding factors that are employed to perform a carryless multiplication according to the present invention. The table 400 is an exact duplicate of the Booth encoding table 200 of FIG. 2, except that the only 3-bit multiplier patterns that are evaluated according to the present invention are 000 and 010. Via preformatting of the multiplier operand according to the present invention, all remaining 3-bit patterns are precluded, as is indicated by strike through lines in the table 400. Consequently, the present invention includes preformatting of the multiplier in a carryless multiplication operation where existing Booth encoding apparatus is utilized, but where all bit patterns that introduce carries into partial products are precluded.

Figure 5:
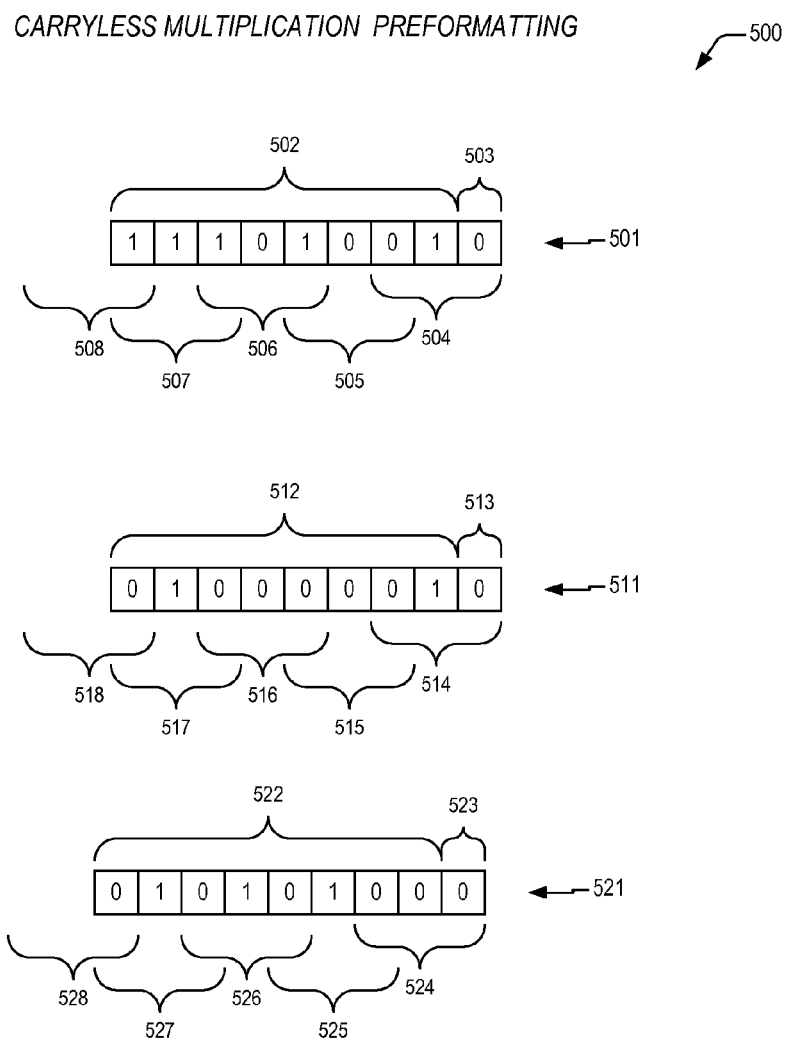
FIG. 5 is a block diagram illustrating how an operand is preformatted according to the present invention in order to perform a carryless multiplication operation using Booth encoding.

Turning to FIG. 5, a diagram 500 is presented illustrating how an operand is preformatted according to the present invention in order to perform a carryless multiplication operation using Booth encoding. The diagram 500 shows three encoded expressions 501, 511, 521 of the operand. The first expression 501 depicts the 8-bit operand 502 with a bit 503 of value 0 concatenated to the least significant bit of the operand 502. Under the convention that the least significant bit of the operand 502 is numbered bit 0, the second expression 511 depicts even bits of the operand 502 with its odd bits replaced by bits of value zero, and is known as an even portion 512 of the operand 502. To perform Booth evaluation of the even portion 512, a bit 513 of value 0 is concatenated to the least significant bit of the even portion 512. The third expression 521 depicts odd bits of the operand 502 with its even bits replaced by bits of value zero and shifted right by one bit, and is known as an odd portion 522 of the operand 502. And to perform Booth evaluation of the odd portion 522, a bit 523 of value 0 is concatenated to the least significant bit of the odd portion.

It is noted that together the even portion 512 and odd portion 522 are a complete representation of the original operand 502 and can be employed to perform multiplication operations in place of the operand 502 with the provisions that 1) results of multiplication of any multiplicand by the odd portion 522 be left shifted by one bit and 2) the results of multiplication of the multiplicand by the even portion 512 and by the odd portion 522 be summed to generate a final result of the multiplication.

In essence, the preformatting of the operand 502 according to the present invention into an even portion 512 and an odd portion 522 are what enable the use of a typical Booth encoder to perform multiplication. It is noted that a multiplication operation performed in this manner will necessarily involve approximately twice a many steps through a conventional multiplication unit over those required when only the normally formatted operand 502 is employed, however, the present inventor has observed that preformatting the operand 502 into an even portion 512 and an odd portion 522 allow multiplication operations to be executed using a convention Booth encoder, yet the possibility of implicit carries are precluded because all 3-bit patterns 514-518, 524-528 that are evaluated are either 000 or 010, which map (as shown in FIG. 4) to partial product multiplying factors of 0 and 1, respectively. Hence, the technique according to the present invention is provided to perform carryless multiplication operations via conventional Booth encoding mechanisms, thus eliminating the need to provide more complex carryless multiplication apparatus in a microprocessor or other device. Should 3-bit patterns 504-508 of the original operand be evaluated, pattern 505 would map to a multiplying factor of plus two, which would implicitly introduce a carry into a multiplication operation. However, non of the patterns 514-518, 524-528 resulting from preformatting for carryless multiplication introduce implicit carries.

Figure 6:
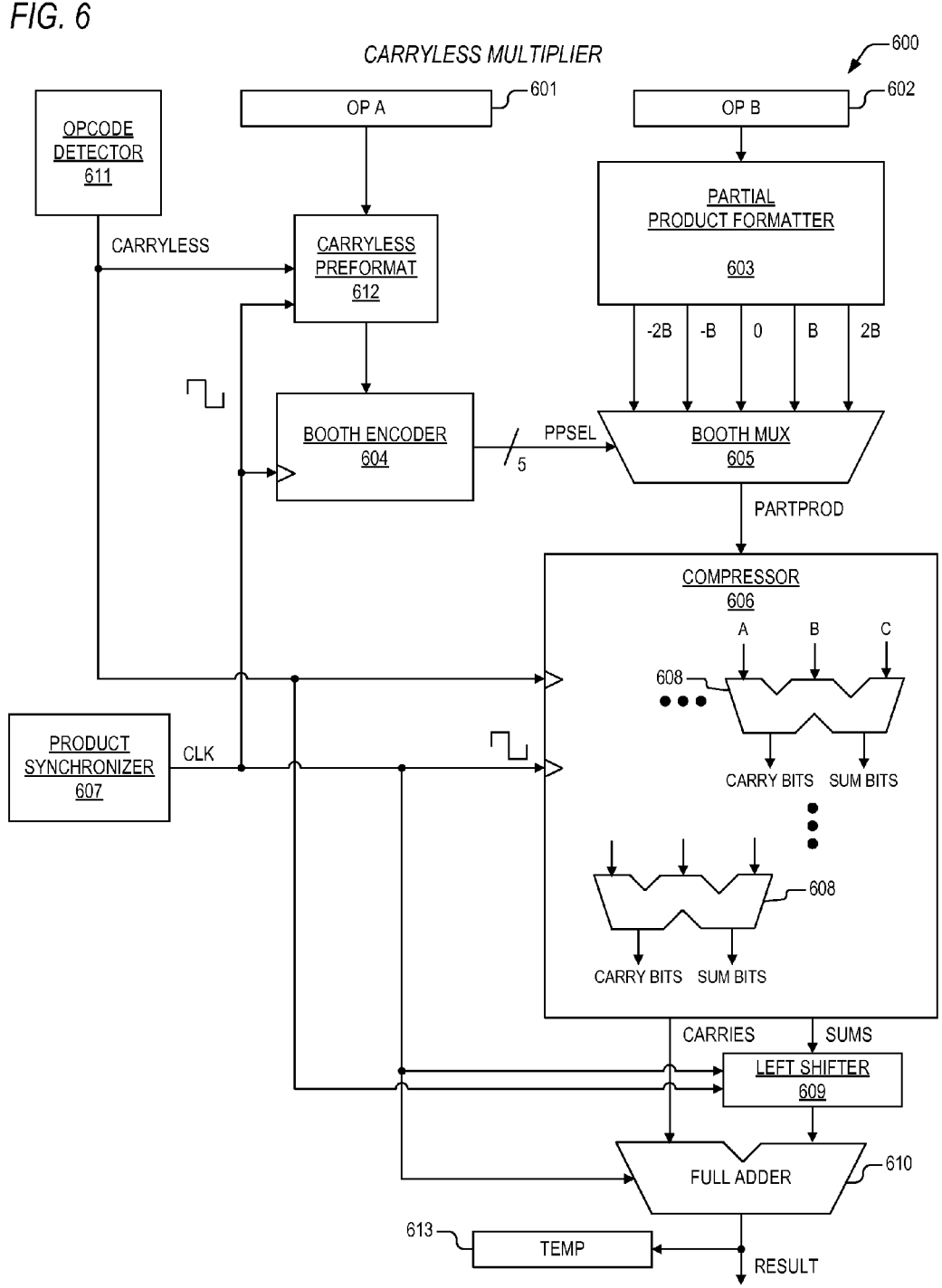
FIG. 6 is a block diagram detailing a carryless multiplication unit according to the present invention.

Turning now to FIG. 6, a block diagram is presented detailing a carryless multiplication unit 600 according to the present invention. The carryless multiplication unit 600 is substantially similar to the present day multiplication unit 100 of FIG. 1, as will be noted below. The multiplication unit 600 includes a first operand register 601 that is coupled to carryless preformat unit 612. The preformat unit 612 is coupled to a Booth encoder 604. The multiplication unit 600 has a second operand register 602 that is coupled to a partial product formatter 603. Both the Both encoder 604 and the partial product formatter 103 are coupled to a Booth mux 605. The Booth mux 605 is coupled via a bus PARTPROD to a compressor 606 having carryless compression features. The compressor 606 has a carryless enable input and includes a plurality of carry save adders (CSAs) 608 configured in the well known Wallace tree configuration. The compressor 606 is coupled to a left shifter 609 via a bus SUMS and to a full adder 610 via a bus CARRIES. The left shifter 602 is coupled to the full adder 610. In one embodiment, the adder 610 generates a 128-bit sum via bus RESULT. Bus RESULT couples the adder 610 to a register 613, TEMP. In addition, a product synchronizer 607 generates a synchronization signal CLK, which is coupled to the preformatter 612, the compressor 606, and the left shifter 609 in order to synchronize operations within the multiplier 600 associated with generation of the final 128-bit product. In addition, the multiplier 600 according to the present invention includes an opcode detector 611 that produces a signal CARRYLESS, which is coupled to the preformatter 612, the compressor 606, the left shifter 609, and the full adder 610.

In operation, an instruction (not shown) directing either a conventional multiplication operation or a carryless multiplication operation are dispatched to the multiplication unit 600 along with direct, indirect, or immediate reference to two operands for the operation. In one embodiment, a 64-bit multiplier operand OP A in two's complement format is provided to the first operand register 601 and a 64-bit multiplicand operand in two's complement format is provided to the second register 602. It is noted, however that other embodiments contemplate operand sizes other than 64 bits In another embodiment, 64-bit multiplication can also be performed by breaking up two 64-bit operands into four 32-bit operands and making multiple passes through the multiplication unit 600 using well known present day techniques and mechanisms.

As in the multiplier 100 of FIG. 1, Booth encoding is employed in the multiplier 600 according to the present invention as a technique to reduce the number of partial products that are required to be summed in order to produce the final product. In one embodiment, a 3-bit Booth encoder 604 is employed, which successively operates to generate the partial products formed from the results of radix-4 multiplications, thus reducing the number of partial products that are summed to form the final result roughly by a factor of two. Other embodiments contemplate Booth encoders of different radices, with commensurate modification of carryless preformatting, postformatting, and partial products that is necessary to eliminate implicit carries when performing carryless multiplication. Accordingly, in synchronization with signal CLK, the Booth encoder 604 evaluates successive 3-bit segments of its input and asserts one of five select signals to the Booth mux 605 via bus PPSEL. The signals on bus PPSEL direct the Booth mux 605 to select one of five partial products associates with OP B. These partial products are generated by the partial product formatter 603 and include zero times the OP B, plus and minus one times OP B, and plus and minus two times OP B. As one skilled in the art, these five partial products are easily formed by the partial product formatter 603 via either complementing OP B, left shifting OP B, or both complementing and left shifting OP B.

If the opcode detector 611 detects a normal multiplication instruction, then signal CARRYLESS is not asserted. Accordingly, the carryless preformat unit 612 simply passes the multiplier in register OP A 601 through to the Booth encoder 604. If a carryless multiplication instruction is detected, then the detector 611 asserts signal CARRYLESS, which directs the preformatter 612 to break the multiplier up into an even portion and an odd portion, and to present these portions in sequence to the Booth encoder for evaluation, as was discussed above with reference to FIG. 5.

Signal CLK directs the Booth encoder 104 to examine successive 3-bit values of its input and additionally directs the compressor 606 to store the corresponding partial products until all successive 3-bit values have been evaluated. In the case that CARRYLESS is not asserted (i.e., a normal multiplication instruction), the partial products are distributed to associated inputs A, B, C of the configured CSAs 608 in order to yield carry bits on bus CARRIES and sum bits on bus SUMS, which are then summed by the full adder 109 to produce the 128-bit twos complement result on bus RESULT. If CARRYLESS is not asserted, the left shifter 609 simply passes the value of SUMS straight through to the full adder 610. In the case that CARRYLESS is asserted (i.e., a carryless multiplication instruction), the carry bits outputs of all of the CSAs 608 are disabled (i.e., set to zero values) and only the sum bit outputs are enabled. The partial products for an even portion of OP A are distributed to associated inputs A, B, C of the configured CSAs 608 in order to yield sum bits associated with the even portion on bus SUMS, which are temporarily stored in the register 613. Next, the partial products for the odd portion of OP A are distributed to associated inputs A, B, C of the configured CSAs 608 in order to yield sum bits associated with the odd portion on bus SUMS, which are then left shifted by one bit via the left shifter 609. In both instances, the value provided to the adder 109 on bus CARRIES is zero. Following generation of the odd portion on bus SUMS, a final carryless result is generated via performing an exclusive OR operation on the contents of TEMP 613 (the even sum) and the value on RESULT (the odd sum).

The multiplication unit 600 according to the present invention is configured to perform normal or carryless multiplication operations as described herein. The multiplication unit 600 comprises logic, circuits, devices, or microcode (i.e., micro instructions or native instructions), or a combination of logic, circuits, devices, or microcode, or equivalent elements that are employed to perform the noted operations as described according to the present invention. The elements employed to perform these operations may be shared with other circuits, microcode, etc., that are employed to perform other functions within the a processor or other device. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC). For a complex instruction set computer (CISC) such as an x86-compatible microprocessor, x86 instructions are translated into associated micro instructions, and the associated micro instructions are directly executed by a unit or units within the CISC microprocessor.

As one skilled in the art will appreciate, the addition of the opcode detector 611, the carryless preformat unit 612, and the left shifter 609, along with minor modifications to the compressor 606 and full adder 610, represent a very inconsequential amount of hardware modification to a very complex unit that is present in most processors today. The performance impact to normal multiplication operations is inconsequential and while execution of a carryless multiplication operation is takes roughly twice the amount of time, the present inventor notes that the benefits derived via the present invention (e.g., lower power, higher reliability, less debug and test problems, etc.) more than offset the performance attribute.

Figure 7:
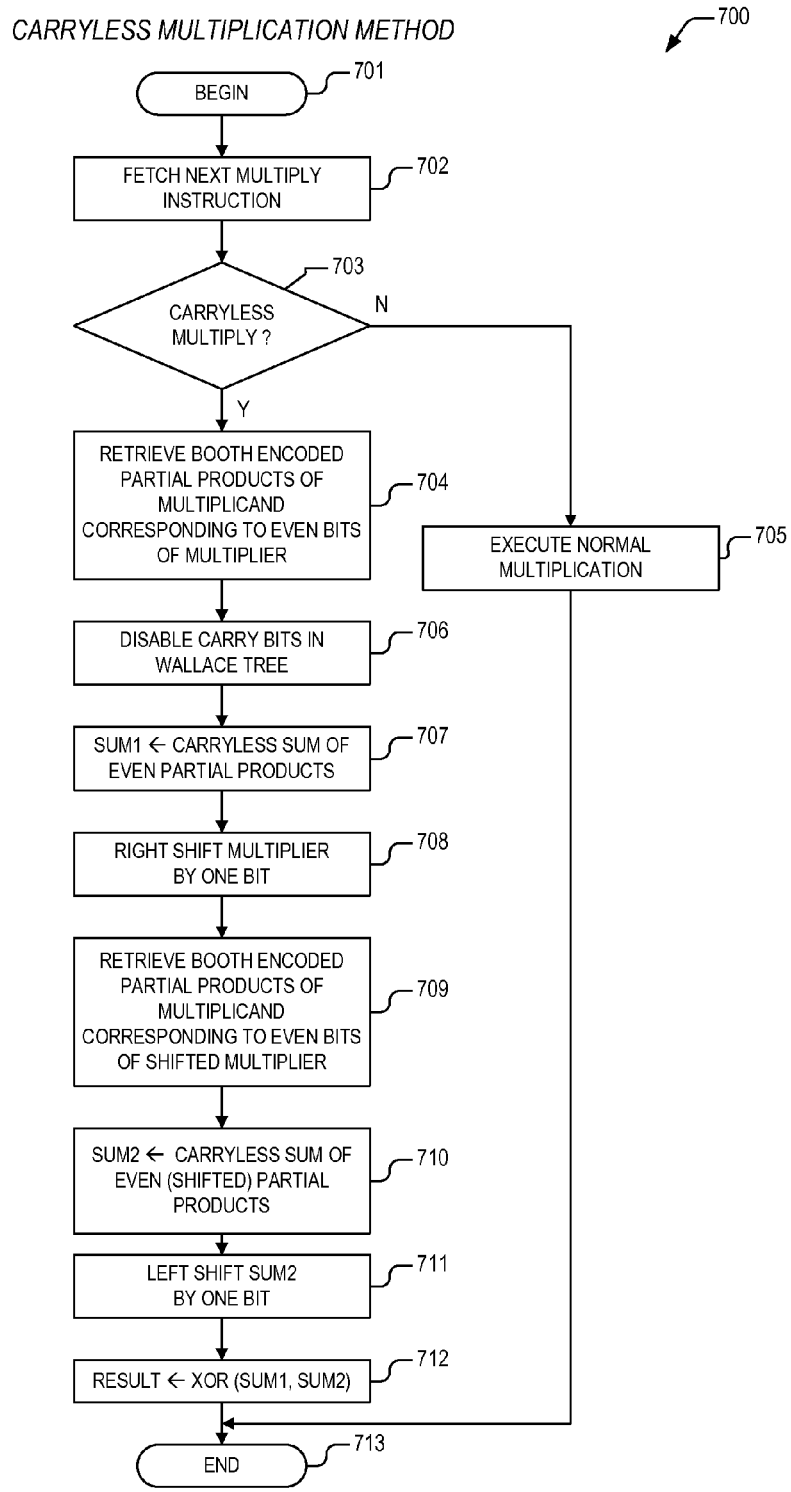
FIG. 7 is a flow diagram showing a carryless multiplication method according to the present invention.

Referring to FIG. 7, a flow diagram 700 is presented showing a carryless multiplication method according to the present invention. Flow begins at block 701 where a processor, microprocessor, or other device is required to execute instructions directing both normal and carryless multiplication. Flow then proceeds to block 702.

At block 702, a next multiply instruction is fetched for execution and is dispatched to a multiplication unit. Flow then proceeds to decision block 703.

At decision block 703, an evaluation is made to determine if a carryless multiplication instruction has been received by the multiplication unit. If not, then flow proceeds to block 705. If so, then flow proceeds to block 704.

At block 705, a normal multiplication operation is performed by the multiplication unit which employs both Booth encoding and compression techniques to reduce the number of partial products required to generate a final result. Flow then proceeds to block 713.

At block 704, even bits of a multiplier operand, with odd-numbered bits set to zero value, are evaluated as 3-bit sequences according to Booth encoding techniques to determine and select a plurality of even-numbered partial products for the carryless multiplication result. Because the odd-numbered bits of the multiplier are set to zero, all implicit carries associated with Booth encoding are precluded. Flow then proceeds to block 706.

At block 706, the carry bits in a corresponding compressor in Wallace tree configuration are set to zeros. Flow then proceeds to block 707.

At block 707, a first carryless sum SUM1 is generated by performing an exclusive-OR on all of the even-numbered partial products. Flow then proceeds to block 708.

At block 708, the multiplier operand is right-shifted by one bit. Flow then proceeds to block 709.

At block 709, an odd part of the multiplier operand is formed by inserting zeros into the odd-numbered bits of the right-shifted operand and evaluating 3-bit sequences of the odd part according to Booth encoding techniques to determine and select a plurality of odd part partial products for the carryless multiplication result. Flow then proceeds to block 710.

At block 710, a second carryless sum SUM2 is generated by performing an exclusive-OR on all the odd part partial products. Flow then proceeds to block 711.

At block 711, SUM2 is left-shifted by one bit. Flow then proceeds to block 712.

At block 712, an exclusive-OR operation is performed on SUM1 and SUM2 to yield a final carryless multiplication result. Flow then proceeds to block 713.

At block 713, the method completes.

Although the present invention and its objects, features, and advantages have been described in detail, other embodiments are encompassed by the invention as well. For example, the present invention has been predominately discussed with reference to 64-bit carryless multiplication, primarily because that is the prevalent operand size presently employed by processors and other devices of the sort which would perform such a function. However, it is noted that the techniques and mechanisms taught herein can be generally applied to any operand size and thus the present invention should be afforded such scope.

Also, many present day multiplication units employ a multi-pass approach. For example, 64-bit operands are broken up into four 32-bit operands and four passes are made through the multiplication unit to form partial results, which are then summed together to form a final result. Certainly the present invention extends to such multiplies for one of the objects of the present invention is to merely use the existing Booth encoding and partial product generation hardware that is presently used for normal multiplication.

Finally, although radix-4 Booth encoding techniques are discussed, it is noted that the present invention extends as well to higher radices as well under the premise that in order to utilize existing Booth encoding hardware, an input operand is simply decomposed into parts by selecting specific bits of the operand while zeroing out the non-selected bits in order to perform the Booth encoding in a manner that eliminates any possibility of implicit carries being present in a partial product.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An apparatus for performing carryless multiplication, comprising:
   a carryless preformat unit, configured to receive a multiplier operand, and configured to partition said multiplier operand into a plurality of parts;
   a Booth encoder, configured to receive said plurality of parts, configured to evaluate said plurality of parts, and configured to direct selection of first partial products of a multiplicand operand, wherein said plurality of parts are configured such that said Booth encoder is precluded from selection of second partial products, and wherein said second partial products reflect implicit carry operations;
   a compressor, operatively coupled to said Booth encoder, configured to sum said first partial products via a configuration of carry save adders that generate sum bits and carry bits, wherein said carry save adders are arranged in a Wallace tree configuration, and wherein generation of said carry bits is disabled during execution of the carryless multiplication;
   a left shifter, coupled to said compressor, configured to shift bits of one or more outputs of said compressor; and
   exclusive-OR logic, coupled to said compressor and said left shifter, configured to execute an exclusive-OR function on said outputs to yield a carryless multiplication result.

2. The apparatus as recited in claim 1, wherein said multiplier operand is expressed in twos complement format.

3. The apparatus as recited in claim 1, wherein said plurality of parts comprises:
   an even part comprising even bits of said multiplier operand with odd bit positions of said multiplier operand set to zero; and
   an odd part comprising odd bits of said multiplier operand with even bit positions of said multiplier operand set to zero and shifted right by one bit;
   wherein said even bits comprise the least significant bit of said multiplier operand.

4. The apparatus as recited in claim 1, wherein said Booth encoder comprises a radix-4 Booth encoder, configured to direct selection of partial products.

5. The apparatus as recited in claim 1, wherein said first partial products comprise first multiples of said multiplicand operand, said first multiples comprising:
   zero times said multiplicand operand; and
   one times said multiplicand operand.

6. The apparatus as recited in claim 5, wherein said second partial products comprise second multiples of said multiplicand operand, said multiples comprising:
   two times said multiplicand operand; and
   negative two times said multiplicand operand.

7. The apparatus as recited in claim 1, wherein said operands comprise 64-bit operands.

8. The apparatus as recited in claim 1, wherein the apparatus is disposed in a multiplication unit in a processor or other device.

9. A microprocessor, comprising:
   a multiplication unit, configured to perform carryless multiplication in addition to normal multiplication, said multiplication unit comprising:
      a carryless preformat unit, configured to receive a multiplier operand, and configured to partition said multiplier operand into a plurality of parts;
      a Booth encoder, configured to receive said plurality of parts, configured to evaluate said plurality of parts, and configured to direct selection of first partial products of a multiplicand operand, wherein said plurality of parts are configured such that said Booth encoder is precluded from selection of second partial products, and wherein said second partial products reflect implicit carry operations;
      a compressor, operatively coupled to said Booth encoder, configured to sum said first partial products via a configuration of carry save adders that generate sum bits and carry bits, wherein said carry save adders are arranged in a Wallace tree configuration, and wherein generation of said carry bits is disabled during execution of the carryless multiplication;
      a left shifter, coupled to said compressor, configured to shift bits of one or more outputs of said compressor; and
      exclusive-OR logic, coupled to said compressor and said left shifter, configured to execute an exclusive-OR function on said outputs to yield a carryless multiplication result.

10. The microprocessor as recited in claim 9, wherein said multiplier operand is expressed in twos complement format.

11. The microprocessor as recited in claim 9, wherein said plurality of parts comprises: an even part comprising even bits of said multiplier operand with odd bit positions of said multiplier operand set to zero; and an odd part comprising odd bits of said multiplier operand with even bit positions of said multiplier operand set to zero and shifted right by one bit; wherein said even bits comprise the least significant bit of said multiplier operand.

12. The microprocessor as recited in claim 9, wherein said Booth encoder comprises a radix-4 Booth encoder, configured to direct selection of partial products.

13. The microprocessor as recited in claim 9, wherein said first partial products comprise first multiples of said multiplicand operand, said first multiples comprising: zero times said multiplicand operand; and one times said multiplicand operand.

14. The microprocessor as recited in claim 13, wherein said second partial products comprise second multiples of said multiplicand operand, said multiples comprising: two times said multiplicand operand; and negative two times said multiplicand operand.

15. The apparatus as recited in claim 9, wherein said operands comprise 64-bit operands.

16. A method for performing carryless multiplication, comprising: within a multiplication unit in a processor, preformatting a multiplier operand into a plurality of parts; via a Booth encoder, evaluating the plurality of parts, and directing selection of first partial products of a multiplicand operand, wherein the plurality of parts are configured such that the Booth encoder is precluded from selection of second partial products, and wherein the second partial products reflect products having bits derived by propagation of carries; via a plurality of carry save adders configured as a Wallace tree, disabling generation of carry bits, and generating sum bits for the first partial products; left shifting bits of one or more outputs of said Wallace tree; and exclusive-ORing outputs of the Wallace tree to yield a carryless multiplication result.

17. The method as recited in claim 16, wherein the multiplier operand is expressed in twos complement format.

18. The method as recited in claim 16, wherein the plurality of parts comprises: an even part comprising even bits of the multiplier operand with odd bit positions of the multiplier operand set to zero; and an odd part comprising odd bits of the multiplier operand with even bit positions of the multiplier operand set to zero and shifted right by one bit; wherein the even bits comprise the least significant bit of the multiplier operand.

19. The method as recited in claim 16, wherein the Booth encoder comprises a radix-4 Booth encoder, configured to direct selection of partial products.

20. The method as recited in claim 16, wherein the first partial products comprise first multiples of the multiplicand operand, the first multiples comprising: zero times the multiplicand operand; and one times the multiplicand operand.

21. The method as recited in claim 20, wherein the second partial products comprise second multiples of the multiplicand operand, the multiples comprising: two times the multiplicand operand; and negative two times the multiplicand operand.

22. The method as recited in claim 16, wherein the operands comprise 64-bit operands.

* * * * *